United States Patent Office 3,095,382
Patented June 25, 1963

3,095,382
COMPOSITION FOR ANALYSIS OF IRON
Clifford C. Hach, Ames, Iowa, assignor to Hach Chemical Company, Ames, Iowa, a corporation of Iowa
No Drawing. Filed Apr. 19, 1960, Ser. No. 23,144
4 Claims. (Cl. 252—408)

This invention relates to compositions useful in chemical analyses for iron. More specifically, the invention is directed to analyses for iron in aqueous systems wherein a compound such as 1,10-phenanthroline is employed to afford color change indicative of the presence of ferrous iron.

It has become rather standard practice to test for the presence of iron in water by a procedure involving the reaction of a material such as 1,10-phenanthroline with ferrous iron to afford a color change which is colorimetrically comparable with a standard. An example of the technique now employed by those in the art is exemplified by the description of a standard method of analyzing for iron as found in the tenth edition of "Standard Methods for the Examination of Water in Sewage," published by the American Public Health Association. The method there described is typical of that in which such tests are currently carried out. Such test first involves acidification with hydrochloric acid, the introduction of a few glass beads and then boiling for five minutes to bring the iron into solution. The sample is then cooled, and carefully measured quantities of hydroxylamine reagent, sodium acetate solution and 1,10-phenanthroline are added. Following this the sample is diluted, mixed and permitted to stand for fifteen minutes before a significant observation can be made.

Since it is common to run tests for iron in the field as well as in the laboratory, the desire to provide a simple method whereby such tests can be carried out has always existed. So far as the present applicant is aware no one heretofore has solved that problem in the manner of the present invention.

In accordance with the present invention it has been found that rapid tests for iron in water or other compositions containing sufficient water to assure solution of the reactants and ionization of the iron can be made colorimetrically by the simple step of admixing therewith a small amount of a composition comprising the following:

|  | Parts by wt. |
|---|---|
| Sodium hydrosulfite ($Na_2S_2O_4$) | 40 |
| Sodium bisulfite ($NaHSO_3$) or sodium metabisulfite ($Na_2S_2O_5$) | 60 |
| An iron reactive coloring agent capable of forming a complex compound with a ferrous iron, such as 1,10-phenanthroline | 4 |

This composition has been found to have the ability to rapidly dissolve iron rust, to reduce ferric iron to ferrous iron, and to buffer the sample to a pH of about 6.5 at which the color-forming complexing agent rapidly reacts with the iron. With such composition a test can be run by the simple steps of adding about 0.1 gram of the foregoing composition to 25 ml. of water and shaking the mixture until color has developed (in about a minute in almost every case). The color thus developed can be readily compared with a standard on a batch basis or the same can be carried out in a continuous manner whereby the sample, e.g., water, is continuously flowed into contact with a metered amount of reagent of the above description, after which the same passes to a colorimeter where continuous colorimetric determination of the change in color can be detected.

The constituent of the composition of the invention responsible for reacting with the ferrous ions to yield color, is the organic heterocyclic compound containing the following group:

Examples of such compounds are 1,10-phenanthroline, 2,2'-bipyridine, 2,2',2''-tripyridine and 2,4,6-tripyridyl-s-triazine (TPTZ), etc. It is not intended to limit the instant invention to any particular one of these compounds. As noted, the fact that such compounds will react with the ferrous ion to give a meaningful colorimetric observation is known to those skilled in the art. It is to the novel composition of the present invention which affords a vastly simplified method of carrying out the test that the instant invention is directed.

Whereas the preferred composition, in accordance herewith, contains about 40% sodium hydrosulfite and about 60% of the sodium bisulfite or sodium metabisulfite, it should be understood that these proportions can be varied rather widely from this optimum. Thus, compositions containing from about 15 to about 85% sodium hydrosulfite, from about 1 to about 5% color-forming heterocyclic such as 1,10-phenanthroline and the remainder the sodium bisulfite or metabisulfite may be used. Most satisfactory results are obtained, however, when employing the preferred composition defined above.

It has been found that when 1,10-phenanthroline is employed in conjunction with the aforesaid composition, the composition tends to turn yellow. Moreover, this yellow coloring is carried over into solutions made with this composition. This yellowing has been eliminated by forming the perchlorate salt of the 1,10-phenanthroline and using the same in the composition of the present invention in the form of the perchlorate salt. The perchlorate salt can readily be made by dissolving the 1,10-orthophenanthroline in hydrochloric acid and adding perchloric acid thereto. The yellowing found with 1,10-phenanthroline has not been found with the other iron color-forming reagents. For purposes hereof reference to 1,10-phenanthroline shall mean either the compound, per se, or its perchlorate salt.

As noted above, an amount of the novel composition added to a sample of water is preferably about 0.1 gram per 25 ml. of sample. But the amount may, of course, be varied from this. The important thing is to have enough to assure conversion of all iron present to ferrous iron, to yield essentially the desired pH and to react with the ferrous iron thus found. Usually, 0.1 gram per 25 ml. of water is sufficient for this purpose.

While the test for iron is carried out most often on water or compositions comprising predominantly water, it will be understood that the composition is useful and the test may be applied to those non-aqueous or low-water content liquids with which an aqueous system of the present composition can be sufficiently admixed to afford an opportunity for the iron to be converted to the ferrous state and react with the heterocyclic. It will be apparent to those skilled in the art that the pH of certain compositions or the presence of chemicals therein capable of reacting or otherwise interfering with the test for iron may render the present composition inapplicable or subject to modification.

It will be further understood, of course, that while the preferred method of the invention involves the use of a pre-mixed composition containing all of the desired reactants, the same can be carried out by adding each individually.

While certain examples have been given herein for the purpose of effecting a full understanding of the instant invention, it will be understood, of course, that the invention is not to be limited thereto but that the same shall be defined only by the spirit and scope of the appended claims. Indeed, while the description of my invention has been given with respect to the sodium salts, which are the most readily available and economical materials, it will be understood that the invention contemplates the use of any equivalent alkali and alkaline earth metal, hydrosulfites and bisulfites.

Having thus described my invention, what I claim as novel and desire to protect by Letters Patent is as follows:

I claim:

1. A composition useful in colorimetric analyses for iron consisting essentially of a minor amount of a heterocyclic organic compound containing the group

which is capable of reacting with ferrous ion to yield a color change from about 15 to about 85% by weight of sodium hydrosulfite and from about 15 to about 85% of compound selected from the group consisting of sodium bisulfite and sodium metabisulfite, the combined amount of said sodium hydrosulfite and of said bisulfite in said composition being at least about 90% of the total composition.

2. The composition of claim 1 wherein the heterocyclic compound is present in the amount of about 4% by weight.

3. The composition of claim 1 wherein the heterocyclic compound is present in the amount of about 4% and sodium hydrosulfite is present in the amount of about 38%.

4. The composition useful in colorimetric analyses for iron consisting essentially of sodium hydrosulfite in the amount of about 40 parts by weight, at least one compound selected from the group consisting of sodium bisulfite and sodium metabisulfite in the amount of about 60 parts by weight and an organic heterocyclic compound containing the group

which is capable of reacting with ferrous ion to yield a color change in the amount of about 4 parts by weight.

References Cited in the file of this patent

Margerum: Anal. Chem., vol. 26, No. 1, January 1954, pages 200–202.